2,980,510
PREPARATION OF FIBROUS TITANIUM DIOXIDE

Kenneth L. Berry, Hockessin, Del., assignor to E. I. du Pont de Nemours and Company, Wilmington, Del., a corporation of Delaware No Drawing. Filed July 21, 1959, Ser. No. 828,459

5 Claims. (Cl. 23—202)

This invention relates to a method for preparing inorganic fibrous materials. More particularly, this invention relates to a method for preparing fibrous titanium dioxide.

Titanium dioxide is well known as a white pigment used in the formulation of paints, plastics, and ceramics, as an opacifier in paper and as a delusterant in synthetic fibers. It is also employed in small proportions in the preparation of synthetic sapphires and rubies to produce asterism by deposition of acicular rutile crystals in major crystallographic planes of the corundum lattice.

Recently a fibrous form of titanium dioxide has been prepared by reaction of titanium tetrahalide with oxygen in contact with a metal halide melt. This fibrous titanium dioxide, which is fully described and claimed in my copending U.S. application Serial No. 761,700, possesses properties of stability at elevated temperatures, high reflectance for infrared radiation and easy feltability which render it useful in applications where a highly refractory asbestos-type material is required such as in thermal insulation, as a reinforcing component of ceramics, cermets and plastics, in paper and other fiber compositions and as a filtering medium, particularly for high temperature applications.

It is an object of this invention to provide a novel process for the preparation of feltable fibrous titanium dioxide.

This and other objects are accomplished by reaction of a halide of tetravalent titanium with a melt consisting of boric oxide, alkali metal borates, or mixtures thereof. The overall reaction occurring in this process is illustrated by the following equation:

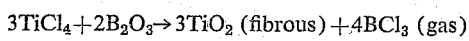

$$3TiCl_4 + 2B_2O_3 \rightarrow 3TiO_2 \text{ (fibrous)} + 4BCl_3 \text{ (gas)}$$

Titanium halides useful in this process of making feltable titanium dioxide fibers are the tetrahalides, including titanium tetrachloride, tetrabromide, tetrafluoride, and tetraiodide, and mixtures thereof. Because of availability and ease of vaporization, it is preferred that the titanium tetrahalide be titanium tetrachloride.

Boric oxide is especially useful in the process of this invention because of its relatively low melting point and because of the fact that the boron trihalide produced as by-product is volatile. Alkali metal borates which have melting points in an appropriate range may also be used as melt constituents. Suitable borates include sodium tetra-, hexa-, and octaborates; potassium tetra-, hexa-, octa-, and decaborates; and eutectics thereof. In general, $B_2O_3$ melts containing up to about 40 mole percent of alkali metal oxide are suitable. Sodium and potassium borates are preferred.

The temperature at which this process is carried out must be sufficient to maintain the boric oxide or metal borate in a liquid condition. Excessively high temperatures are to be avoided because they promote undesirable side reactions, because of practical difficulties in securing suitable materials for construction of equipment, and because of the additional expense involved in maintaining such temperatures. Temperatures from about 580° to 1000° C. and higher are operable but temperatures of 600° to 900° C. are usually employed. When boric oxide is used, temperatures in the range of 650–850° C. are preferred.

The process of this invention is usually carried out at atmospheric pressure and provision of equipment capable of withstanding pressures greatly in excess of atmospheric pressure is not necessary. For ease in handling titanium halide vapors and to prevent access of moisture from the atmosphere, it may in certain cases be desirable to employ pressures slightly above atmospheric pressure. The use of increased pressures also improves the solubility of the titanium halide in the melt thereby increasing the rate of formation, yield and quality of the fibrous product. It is also possible to operate at reduced pressure.

When a molten boron compound as defined above is exposed to titanium halide vapor, reaction occurs at the surface of the melt and produces titanium dioxide fibers arranged in fan and rosette-shaped clusters. It is therefore advantageous to have the melt so contained that it has the highest possible ratio of surface to volume. After the melt has cooled, the fibers may be readily isolated and dispersed by agitation in hot, e.g., boiling water to dissolve any residual solidified melt. Any non-fibrous titanium dioxide inadvertently produced is easily removed from the suspension by allowing the fibrous product to flocculate and separating the liquid containing the suspended non-fibrous particles by any convenient means such as filtration, decantation, and the like. Mats or felts of titanium dioxide fibers are produced from such suspensions by filtration as, for example, through a Fourdrinier screen.

The titanium dioxide fibers so produced have a cross-section of less than 25 microns and an axial ratio, i.e., a ratio of length to cross-sectional dimension, of at least 10:1. It is preferred that the cross-section be less than 5 microns. For the most part, the length of the fiber ranges from 0.2 mm. to 5 mm. or more. For the preparation of felted structures, it is preferred that the fibers have an axial ratio in excess of 100:1. Individual fibers are colorless but when matted together they appear white. X-ray diffraction analysis of these fibers indicates that the atomic arrangement is predominantly of the rutile type.

The properties of fiber mats produced by filtration can be varied considerably in the sedimentation process by the relative amount of coarse and fine titanium dioxide forms permitted to remain with the fibers. Stiffer mat structures result from retention of coarser fibers and needles while fine forms of titanium dioxide can be retained in the fiber mat to alter density or porosity. Additional desirable properties may be achieved by the incorporation of other fillers and extenders such as silica, carbon, asbestos, and the like. By suitable choice of fiber and suspension characteristics and conditions of pressure and temperature under which the suspending medium is separated from the fibers, bulk density and other properties of felted mats from titanium dioxide fibers can be varied widely. Binders such as organic resins, sodium silicate, colloidal alumina or silica, and the like, can be introduced directly to such suspensions or can be added after formation of the felt.

The invention is illustrated by the following examples in which the quantities referred to are in parts by weight.

Example I

Nitrogen gas dried by passage over phosphorus pentoxide was bubbled at a rate of 17 cc./min. through liquid titanium tetrachloride at a temperature of 27° C. The resulting nitrogen-titanium tetrachloride vapor mixture was passed through a silica tube containing 9.4 g. of molten boric oxide in a platinum boat, maintained at a temperature of 600° C. by external heating. After passage over the molten boric oxide, the vapor mixture was passed through a trap cooled to about −78° C. with solid carbon dioxide. During 24 hours of operation, 3.1 g. of titanium tetrachloride was vaporized and unchanged titanium tetrachloride and boron trichloride collected in the trap. Upon cooling, the surface of the boric oxide was found to contain fan and rosette-shaped clusters of fibrous crystals. These were recovered by dissolving the boric oxide in boiling water and separating the suspended crystals by filtration. There was thus obtained 0.02 g. of fibrous titanium dioxide crystals, 1–2 microns in diameter, and about 100 microns long. These crystals were shown by X-ray diffraction to consist entirely of titanium dioxide having the rutile structure.

*Example II*

The procedure described in Example I was repeated with the single exception that the boric oxide melt was maintained at a temperature of 800° C. Fibrous titanium dioxide crystals were obtained in an amount of 0.04 g. during 24 hours operation. When these crystals were suspended in water and filtered, a coherent felted structure was obtained. X-ray diffraction analysis of the product indicated that it consisted entirely of titanium dioxide of which approximately 75% had the rutile structure and the remainder was anatase. Microscopic examination of the product revealed that the fibrous crystals ranged from 1–10 microns in diameter and were up to 0.4 mm. in length.

*Example III*

Using the general procedure of Example I, titanium tetrachloride vapor carried in nitrogen (flow rate 30 cc./min.) was passed into contact with 139 g. of molten boric oxide maintained at a temperature of 775° C. During 47 hours of operation, 9.6 g. of titanium tetrachloride was vaporized. The fibrous crystals of titanium dioxide produced weighed 0.6 g. and possessed the rutile structure as shown by their X-ray diffraction pattern. The crystals were readily felted. Microscopic examination indicated that about 40% of these fibers were less than 5 microns in diameter and were 0.5–1 mm. in length. Some of these long fibers had diameters less than 1 micron.

*Example IV*

Following the general procedure of Example I, dry nitrogen gas was bubbled at a rate of about 5 cc./min. through liquid titanium tetrachloride maintained at a temperature of 131–134.2° C. and the resulting nitrogen-titanium tetrachloride mixture was passed into contact with a melt prepared from 13 g. of anhydrous sodium tetraborate and 40 g. of anhydrous boric oxide. The melt was maintained at 800° C. by external heating. During 70.75 hours, about 250 g. of titanium tetrachloride was volatized. The cooled transparent borate melt was examined at 20× magnification and white fibrous crystals up to 1 mm. long with diameters below 5 microns were observed. After removal of material soluble in hot water, microscopic examination of the remaining solid indicated that about 1% was in the form of fibrous crystals 0.5–0.7 mm. in length and <5 microns in diameter and about 7% was in the form of fibrous crystals 0.2–0.5 mm. in length and <5 microns in diameter. The fibrous crystals showed an X-ray diffraction pattern characteristic of titanium dioxide having the rutile structure.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing fibrous titanium dioxide which comprises reacting a halide of tetravalent titanium with a melt selected from the class consisting of boric oxide, alkali metal borates and mixtures of boric oxide with at least one alkali metal borate.

2. The process of claim 1 wherein the halide is titanium tetrachloride.

3. The process of claim 1 wherein the melt is boric oxide.

4. The process of claim 1 wherein the melt is so contained as to have the highest possible ratio of surface to volume.

5. Process for preparing feltable titanium dioxide fibers which comprises exposing vapors of a tetravalent titanium halide to a molten boron compound of the class consisting of boric oxide, alkali metal borates and mixtures thereof, said molten boron compound being maintained at a temperature of at least 580° C. during the exposure.

No reference cited.